March 18, 1958  R. V. BAKER  2,826,871
WIRE STRIPPER
Filed July 30, 1956

INVENTOR:
Ralph V. Baker
By Hubert E. Metcalf
His Patent Attorney

United States Patent Office 2,826,871
Patented Mar. 18, 1958

2,826,871

WIRE STRIPPER

Ralph V. Baker, Burbank, Calif., assignor to Northrop Aircraft, Inc., Hawthorne, Calif., a corporation of California Application July 30, 1956, Serial No. 600,929

2 Claims. (Cl. 51—71)

This invention has to do with electro-pneumatic or electro-hydraulic tools that are well adapted to strip insulation from electrical wire.

Most, if not all, of the presently known tools, of the type referred to, damage and ruin the wire when the insulation is stripped therefrom. The tools have inadequate stops and the insulation cutters are enabled to penetrate through some of the strands, if the wire is the stranded type. The damaged strands are stripped along with the insulation. Material is scraped off or gouged out if the wire is the solid type. Besides the loss of wire, there is a loss of man hours for the reason insulation must be stripped until the desired result is obtained. Another less easily evaluated loss occurs. Faulty wire used in an electrical instrument will shorten its life and reduce its efficiency.

Additionally, wire strippers using sharp edged cutters to penetrate glass braid or fiber insulation on the wire soon have their edges dulled. They must be removed from the tool and sharpened or be replaced by another set, all of which is a time consuming factor.

An object of this invention is to provide in a wire stripper members that abrade the insulation, from electrical wire, to a predetermined depth without damaging the wire per se.

Another object of this invention is to provide in a wire stripper structure that limits the depth abrader members may penetrate the insulation to strip the same from electrical wire.

A yet further object of this invention is to provide in a wire stripper certain structure that is economically fabricated, easily maintained and has been proved sound in practice.

Briefly the invention comprises a prime mover having rotatable structure thereon into which the wire to be stripped is inserted. Abraders are slidable in the structure and are caused to abrade and remove the insulation from the wire but leave the latter undamaged. A yoke, pneumatically actuated, urges cams in the desired direction to urge the abraders to strip the insulation from the wire. Stop mechanism limits the movement of the yoke and cams in order that only the insulation may be removed from about the wire.

Figure 1:
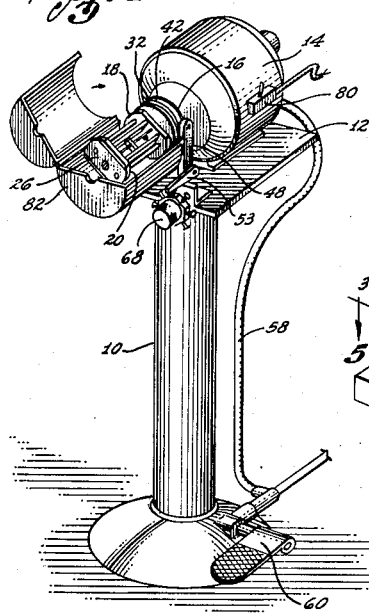
Figure 1 is a perspective view illustrating and having embodied therein the present invention.

Referring to the drawings for a more detailed description of the present invention 10 designates an upright base or frame having a flat plate or table top 12 on the upper extreme.

An electrical motor or prime mover 14, having a rotatable shaft 16, is on the plate. A hubbed plate 18 is on and rotates with the shaft. Another substantially identically shaped plate 20 is connected to plate 18 by rods 22. The last mentioned plate 20 is provided with opposed and slidable metallic abraders 24. These abraders have square or flat edges thereon that engage and remove the insulation from the electrical wire. A retainer plate 26 is attached to plate 20. A central wire receiving opening 27 is provided in plate 20 and retainer 26.

Spanning the distance between plates 18 and 20 is a rod 28 and slidable, to any desired position, on the rod is a wire stop element 30.

Figure 2:
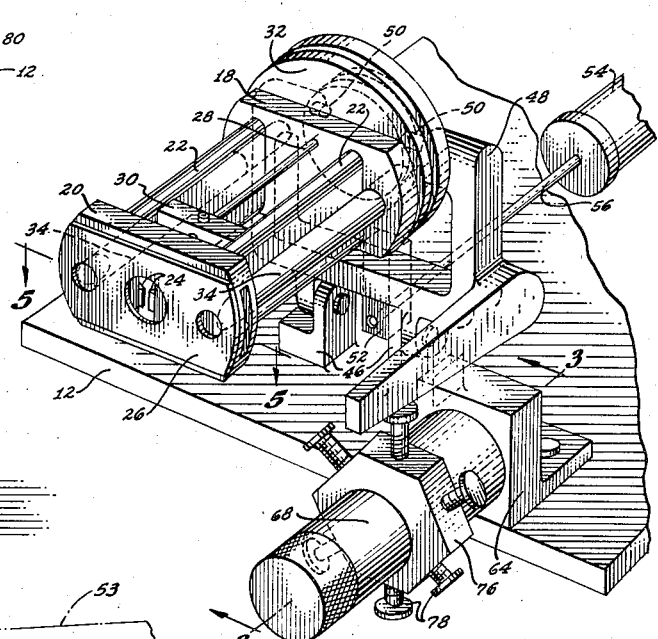
Figure 2 is an enlarged, fragmentary view illustrating the wire stripping and stop mechanism.
Figure 4:
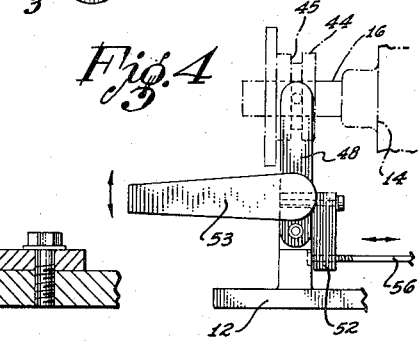
Figure 4 is a side elevation view of the yoke, yoke finger and related structure and illustrating the direction of movement each is urged, to perform an end result.

Slidable back and forth on shaft 16, but not rotatable, is a disc or plate 32. Elongated cams 34, integral with disc 32, extend through openings in plates 18 and 20, Figures 2 and 4. The beveled free ends 36 engage and urge the abraders 24 toward the axis of rotation of the shaft 16. Centrifugal force, absent the cams, urges the abraders 24 away from the axis of rotation.

A stop screw 40 extends through plate 18 and is threaded into disc 32. This screw limits the reciprocable movement of the disc in one direction.

Another disc 42 is slidable and rotatable on the shaft 16. A hub 44, having an annular groove 45, is integral with the disc 42.

Figure 5:
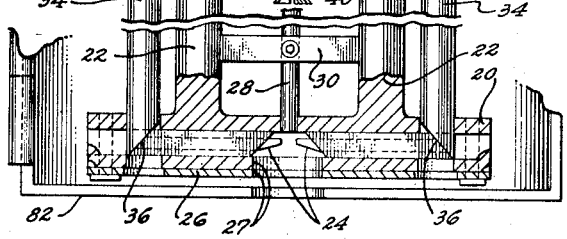
Figure 5 is a fragmentary, cross-sectional view taken on line 5—5 of Figure 2 looking in the direction of the arrows.

On the plate 12 are support brackets 46, only one of which is shown, and pivotally connected to the brackets is a yoke 48. Projections 50, received in annular groove 45, are integral with the yoke 48, Figure 5. An extension 52 along with a finger 53 is made integral with the yoke as may be determined by referring to Figures 2 and 4.

A pneumatic or hydraulic cylinder 54, having a reciprocable piston rod 56, is also mounted on the plate 12. The piston rod is connected to the extension 52. Inlet and outlet conduits for the cylinder 54 are represented by the line 58. A pedal or foot valve 60 opens and closes the conduits to the cylinder 54 and actuates the same.

Figure 3:
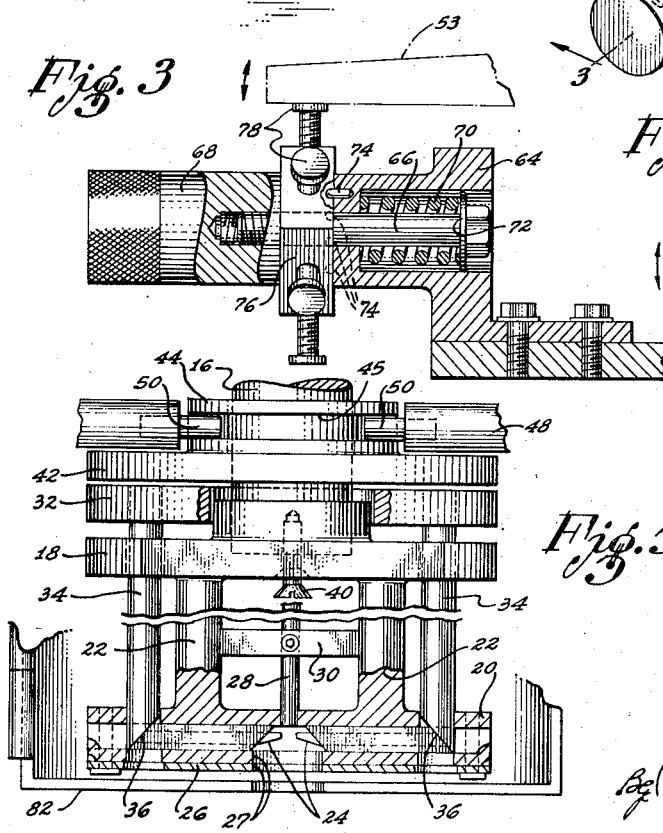
Figure 3 is a cross-sectional view taken on line 3—3 of Figure 2 looking in the direction indicated.

A hollow housing 64 is mounted on the plate 12. Connected to the housing by a bolt 66 is a rotatable plunger 68. The plunger is made spring-loaded by virtue of a spring 70 embracing the bolt and seating against the housing and a washer 72, Figure 3. A plurality of detents 74 are provided between the housing 64 and plunger 68. Spaced around the periphery of a hub 76, integral with the plunger, are a plurality of stops 78. All of the stops have a different length.

A hinged guard cover 82 is provided to protect against injuries.

The operation of the invention is as follows: The switch 80 of the prime mover 14 is turned on and the plates 18 and 20 along with disc 32 are caused to rotate.

The particular stop 78 is selected and the plunger 68 is rotated until the stop is in an underlying relationship with respect to the finger 53.

The wire to be stripped of its insulation is inserted in opening 27, between the abraders 24, and urged against the stop 30.

The foot or pedal valve 60 is pressed to admit air to one side of cylinder 54 to retract the piston rod 56. Retraction of the piston rod pivots the yoke 48 which urges the disc 42 to engage the disc or plate 32. The disc 32, along with the cams 34, is urged toward the plate 20. The beveled free ends 36, on the cams 34, engage the abraders 24 to urge the same toward the axis of rotation and into abrading contact with the insulation on the electrical wire. The cams 34 are limited in their movement by finger 53 striking the selected stop 78. As a result of this limiting factor the penetration the abraders 24 can make in the insulation of the wire is restricted. It may be seen that the abraders may be limited to penetrating only the insulation and not the wire per se. When the insulation has been abraded the wire is pulled out of the openings 38 and the insulation is stripped therefrom.

The gauge of the wire will determine the stop to be selected, and there may be provided a stop for every gauge.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a wire stripper having a frame; a prime mover supported by said frame; said prime mover having a rotatable shaft; means connected to said shaft and rotatable therewith; reciprocable elements on said shaft between the primer mover and said means; a cylinder, on said frame, having a piston rod; a yoke, pivotally mounted on said frame and in engagement with said elements to cause the latter to reciprocate; said yoke being connected to said piston rod; a finger on said yoke; slidable abraders in said means; said abraders having flat edges; at least one elongated cam on said elements that engages the abraders to urge the latter into an abrading position; a rotatable plunger on said frame; a plurality of stops of differing length on said plunger one of which is engaged by said finger, when in alignment therewith, that limits the movement of said cam in one direction.

2. In a wire stripper having a frame; a prime mover supported by said frame; said primer mover having a rotatable shaft; means connected to said shaft and rotatable therewith; reciprocable elements on said shaft between the prime mover and said means; a cylinder, on said frame, having a piston rod; a yoke, pivotally mounted on said frame and in engagement with said elements to cause the latter to reciprocate; said yoke being connected to said piston rod; a finger on said yoke; slidable abraders in said means; said abraders having flat edges; at least one elongated cam on said elements that engages the abraders to urge the latter into an abrading position; a spring loaded and rotatable plunger on said frame; at least one stop on said plunger that is engaged by said finger, when in alignment therewith, that limits the movement of said cam in one direction.

References Cited in the file of this patent
UNITED STATES PATENTS

| | | |
|---|---|---|
| 1,597,460 | Nelson | Aug. 24, 1926 |
| 2,645,959 | Fuchs | July 21, 1953 |